United States Patent [19]
White

[11] Patent Number: 5,995,687
[45] Date of Patent: Nov. 30, 1999

[54] CIRCUIT FOR TESTING AN OPTICAL COMMUNICATION SYSTEM

[75] Inventor: Ian Arthur White, Dunwoody, Ga.

[73] Assignee: Lucent Technologies Inc., Murray Hill, N.J.

[21] Appl. No.: 08/762,897

[22] Filed: Dec. 10, 1996

[51] Int. Cl.⁶ .................................................. G02B 6/26
[52] U.S. Cl. .............................. 385/14; 385/24; 359/127
[58] Field of Search ................ 385/24, 14; 359/124, 359/125, 127, 128

[56] References Cited

U.S. PATENT DOCUMENTS

| | | | |
|---|---|---|---|
| 4,902,086 | 2/1990 | Henry et al. | 350/96.12 |
| 5,285,305 | 2/1994 | Cohen et al. | 359/110 |
| 5,309,534 | 5/1994 | Cohen et al. | 385/27 |
| 5,550,666 | 8/1996 | Zirngibl | 359/125 |
| 5,557,439 | 9/1996 | Alexander et al. | 359/130 |
| 5,566,014 | 10/1996 | Glance | 359/124 |

*Primary Examiner*—Hung N. Ngo

[57] ABSTRACT

An optical integrated circuit is used to simultaneously test both the transmit fiber and the receive fiber in a fiber optic pair which extends between a telephone central office and a subscriber's site. By testing both fibers simultaneously testing time is cut in half without the loss of any important information, as fibers are replaced in pairs. In addition, the cost of test equipment is reduced considerably, as the expensive portions of the test equipment can be used for twice as many optical circuits as was heretofore possible. Finally, there are half as many connections needed between the optical switch and the optical integrated circuits built in accordance with the present invention, thereby simplifying their interconnections, and eliminating the extra cost in optical ports and interconnecting fiber.

5 Claims, 1 Drawing Sheet

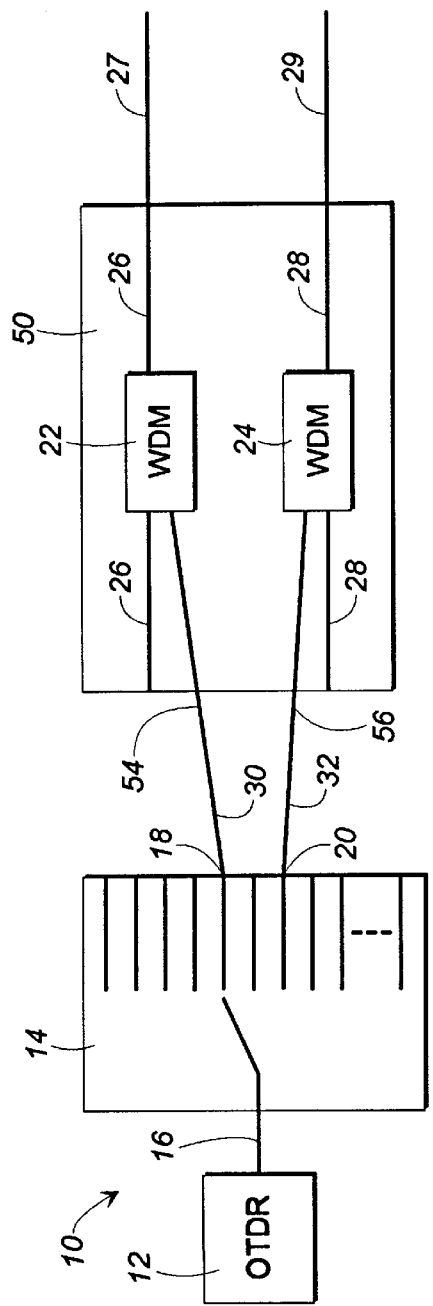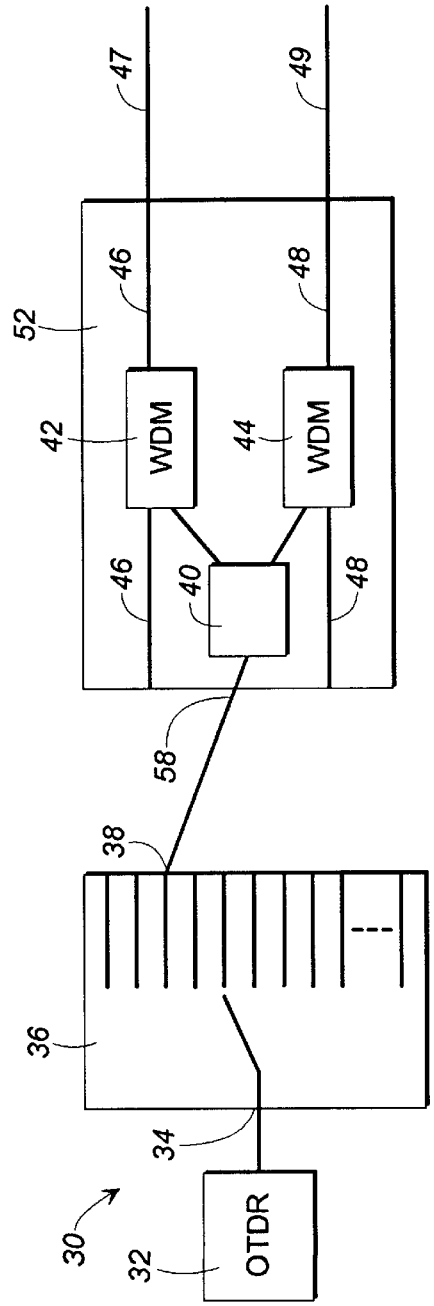

CIRCUIT FOR TESTING AN OPTICAL COMMUNICATION SYSTEM

FIELD OF THE INVENTION

The present invention relates to a circuit for testing fiber optic communications cables. In particular, the invention relates to an optical integrated circuit for testing fiber optic communications systems.

BACKGROUND OF THE INVENTION

Heretofore, telephone lines have been primarily comprised of copper cables. In particular, pairs of copper cable have extended from telephone central offices to individual residential and commercial customers. Presently, there are on the order of one hundred fifty million telephone lines which extend to the premises of such customers ("subscribers"). The vast number of subscriber lines requires that means be provided for automatically testing such lines whereby, if a fault were to occur to a line, an appropriate service person could be dispatched to make repairs, possibly even before the subscriber becomes aware of the fault. Thus, automatic test equipment has been developed which is capable of testing subscriber lines repetitively and automatically.

As the metal network, comprised of copper cabling, is being replaced by fiber optic lines, the need has arisen to provide means for automatically testing the fiber optic communications lines, in much the same manner that the copper cables have heretofore been tested. A problem with the testing of fiber optic lines, however, is that, unlike copper, it is significantly more difficult to launch a test signal into a fiber optic path. In particular, it is quite simple with copper to make an electrical connection anywhere along the cable without otherwise impairing any other connection which has been made to the cable. With fiber optic lines, on the other hand, connections are significantly more difficult to make in that means must be provided for coupling the optical test signal onto the path to be tested in order to both launch the test signal into the line and to view the results of such test signal. In addition to the problem of coupling signals into a fiber optic line, there is also a problem in that the equipment which is used for such testing is extremely expensive. Consequently, the difficulty in coupling signals to a fiber optic line is compounded by the large expense involved in both coupling signals and in providing the signals in the first place. Thus, it would be desirable to be able to provide, and substantially reduce the expense of, means for automatically testing fiber optic lines which does not have the problems of the systems heretofore used.

SUMMARY OF THE INVENTION

In accordance with the present invention, a new optical integrated circuit facilitates testing optical communication systems of the type wherein a pair of optical fibers is used between each of two communications points, such as a telephone central office and a subscriber's site, is described. One of the pair of optical fibers being tested is a transmit fiber, used to transmit data, and the other one of the pair of optical fibers being tested is a receive fiber, used to receive data.

A test device is used by the system to inject a test signal into an optical fiber. A switching device is used to selectively connect the test signal to one of a plurality of coupling devices which are connected to the optical fiber pairs which extend between the two communications points.

In accordance with the present invention there is an improvement over the prior art in that there are means within each of the coupling devices for splitting the test signal into two test signals, so that both the transmit fiber and the receive fiber in the optical fiber pair can be tested simultaneously.

BRIEF DESCRIPTION OF THE DRAWINGS

In the Drawing:

FIG. 1 is an illustration of the optical fiber testing apparatus of the prior art; and FIG. 2 is an illustration of the optical fiber testing apparatus in accordance with the present invention.

DETAILED DESCRIPTION OF THE PREFERRED EMBODIMENT OF THE INVENTION

Referring to FIG. 1, the optical fiber test system 10 and method of the prior art will be described. The prior art system 10 is used to test optical fibers used for communications, such as telecommunications fibers 27, 29, which extend between a telephone central office and a subscriber's site. As shown, the optical fibers 27, 29 are coupled to waveguides 26, 28, respectively, which are shown to be part of an optical integrated circuit device 50. It will be understood by those skilled in the art that the optical integrated circuit device 50 is actually connected in series with the pair of fibers 27, 29 which are optically coupled to the waveguides 26, 28, which are part of the optical integrated circuit 50, in the standard manner. Those skilled in the art will recognize that the waveguides 26, 28 are typically formed on a substrate ("wafer") as silicon dioxide, $SiO_2$, traces. By way of example, the construction of an optical integrated circuit is described in U.S. Pat. No. 4,902,086 entitled DEVICE INCLUDING A SUBSTRATE-SUPPORTED OPTICAL WAVEGUIDE, AND METHOD OF MANUFACTURE, which issued on Feb. 20, 1990 to Charles H. Henry, et al., the contents of which are incorporated herein by reference.

In accordance with the prior art method of testing optical fibers, the system 10 uses a test device for injecting a test signal into an optical fiber. As will be understood by those skilled in the art, an optical time domain reflectometer ("OTDR") is typically used to perform such testing. As will be further discussed hereinafter, OTDRs are quite expensive, so a single OTDR 12, is connected to the single input 16 into an optical switch 14. The optical switch 14 has a single input port 16, and many output ports, such as the output ports 18, 20. The input port 16 is switched among the various output ports, so the switch 14 is called a "1×N" optical switch, where N is an integer greater than one. Typically, N is 100 in the optical switches currently in use. As will be explained hereinafter, the larger N is, the lower the cost is per customer site. As shown, the output ports 18, 20 of the optical switch 14 are connected to devices which are used to inject test signals into the optical fibers. In accordance with the preferred embodiment of the invention, the signal injection devices are comprised of wave division multiplexers ("WDMs") 22, 24. WDMs 22, 24 are devices which can couple an optical signal into an active fiber, such as the fiber 26, to which the WDM 22 is coupled, and the fiber 28, to which the WDM 24 is coupled.

As illustrated in FIG. 1, the optical fiber 26 is a transmit fiber (relative to the central office), and the optical fiber 28 is a receive fiber (relative to the central office). Problems with the apparatus 10 and method illustrated in FIG. 1 are that the expense of the equipment is high, and the time to test all of the fibers in the central office is also high. By way of example, a typical central office of the near future may have between about 7,500 and 10,000 optical fibers terminated in it. Each communication path between the central office and a subscriber's site uses a pair of these fibers, one of which is used for transmitting and the other one of which is used for receiving, as optical fibers are used in a so-called "simplex" mode. Thus, while the transmission and reception are each done on separate fibers, a pair of fibers (one transmit fiber and one receive fiber) are actually used between each customer's site and the central office. As will be obvious to those skilled in the art, the use of the terms "transmit fiber" and "receive fiber" herein, are meant to identify the fibers in a pair based upon their use from the perspective of the central office. Obviously, the same two fibers, when viewed from the customer's site, will have opposite uses. In any event, if either of the fibers in any given pair was to go bad, the entire pair would be replaced, as there is no attempt made to save individual fibers in a pair.

Referring now to FIG. 2, the present invention will be described. In accordance with the present invention, a system 30 employing a single OTDR 32 which is connected to an input port 34 of a "1×100" optical switch 36, is shown. The OTDR 32 and the 1×100 optical switch 36 may be the same as those found in the prior art system 10 of FIG. 1. However, in accordance with the present invention, a single output port 38 of the optical switch 36 goes to a test signal router 40, which may be either a power splitter or a WDM. If the test signal router device 40 is a WDM, it will be able to direct different wavelength outputs from the OTDR 32, through an additional pair of WDMs 42, 44, to simultaneously test both the transmit and the receive fibers connected to a given pair of waveguides 46, 48 in which one 46 is connected to the transmit fiber, while the other one 48 is connected to the receive fiber. By splitting the OTDR signal into two signals using the test signal router device 40, it is possible to simultaneously test both the transmit and receive fibers connected between the central office and a customer's premises. This is accomplished in either of two ways in accordance with the present invention. Thus, if the test signal router device 40 is a power splitter, then two different signals are sent out of the device 40 to the WDMs 42, 44. Alternatively, where the test signal router device 40 is a WDM, then two different OTDR wavelengths are sent from the test signal router device 40 to the WDMs 42, 44.

The manner in which a test is actually conducted is known to those skilled in the art. Typically, though, a signal is sent from the OTDR 32 through the test signal router 40. Two test signals then travel through the WDMs 42, 44, then through the waveguides 46, 48, and down the fibers 47, 49. Based upon the signal, if any, which returns to the OTDR 32, a measure of the condition of the fibers 47, 49, can be made.

In accordance with the invention, only one output port 38 of the optical switch 36 is needed to perform a test, which is conducted simultaneously on using both waveguides 46, 48, while in the prior art system of FIG. 1, two output ports 18, 20 of the optical switch 14 were needed to perform separate tests on a given pair of fibers 26, 28 which lead to the same customer's site. Thus, in accordance with the present invention, both the time taken to perform testing, and the cost per customer site are significantly reduced.

By way of example, if an OTDR costs between about $10,000 and $60,000, and a 1×100 optical switch costs between about $10,000 and $20,000, in accordance with either the prior art or the current invention, the cost of the OTDR and the optical switch alone would be between about $20,000 and $80,000 for the ability to connect a single OTDR to 100 individual fiber paths. In accordance with the prior art, however, those fiber paths are connected, as shown, through an optical integrated circuit 50, which includes the two WDMs 22, 24, to a single subscriber's site using two output ports 18, 20 of the optical switch 14. In accordance with the present invention, on the other hand, those fiber paths are connected though the optical integrated circuit 52 of the present invention, to a single subscriber's site using a single switch port 38 on the optical switch 36.

In accordance with the preferred embodiment of the present invention, the optical integrated circuits 50, 52 referred to herein are planar waveguide optical circuits. These are solid state (semiconductor) devices, similar to semiconductor integrated circuits, which are manufactured using the same technology as is used in the manufacture of semiconductor integrated circuit devices (See U.S. Pat. No. 4,902,086 of Henry, et al. referenced above). Using present technology, the cost to produce such a device is on the order of about $10 to $50 per chip. However, the optical connections, used to connect them to the optical fibers being tested, add considerable expense to the cost of each chip. Thus, by saving optical ports, additional savings are incurred. With respect to the prior art system 10, shown in FIG. 1, two optical ports 54, 56 are used between the optical switch 14 and the optical integrated circuit 50, while in the present invention, only a single optical port 58 is needed between the optical switch 36 and the optical integrated circuit 52. This yields an additional savings by the system 30 of the present invention, as compared to the prior art system 10, shown in FIG. 1.

Thus, in accordance with the present invention, a number of beneficial cost savings factors have been introduced which, when taken together, considerably decrease the overall cost of the testing circuit, when measured on a per customer site basis. In addition to the substantial cost savings, as the cost of the system 30 is less than one-half the cost of the system 10 of the prior art, on a per customer site basis, there is also a substantial time savings when the system 30 is used to test optical fibers, as compared to the cost of testing using the system 10 of the prior art.

Using the foregoing typical central office having approximately 10,000 optical fibers passing through it, and assuming that it takes about three minutes to run a single test, it would take about 30,000 minutes, or approximately three weeks to test all of the fibers passing through the office using the system 10 of the prior art. Using the present system, however, in which a pair of fibers, e.g., the fibers 47, 49 are tested simultaneously, tests of the pairs between the central office and the customers' sites will take one-half as long to perform, as both the transmit and receive fibers 47, 49 are being tested at the same time. As explained above, if either of the fibers 47, 49 in a pair going to a customer's site is identified as being bad, the entire fiber pair is replaced, so this pairing of the fibers, in order to pare down the number of tests, results in a substantial time savings without the loss of any information which may be important.

Yet another advantage of the present invention is that there are half as many connections between the optical switch 36 and the optical integrated circuit 52 as there were between the optical switch 14 and the optical integrated circuit 50. This means that the process of connecting the optical switch 36 to the optical integrated circuits 52 is simpler and that only half as many fibers are needed, as were needed to connect the optical switch 14 to the optical integrated circuit 50.

As described above, the optical integrated circuit 52 could include two WDMs 42, 44 and a splitter, or WDM 40, as shown in FIG. 2, all of which are formed on a single substrate, or wafer.

In use, the OTDR 32 might send test signals at a first wavelength, e.g., λ=1500 nm, whereas the transmission signals on waveguides 46, 48 are at a different wavelength, e.g., λ=1310 nm. As will be understood by those skilled in the art, the coupling takes place within the WDM, which may be a Mach-Zehnder interferometer, of the type described in OPTICAL FIBER TELECOMMUNICATIONS II, by Stewart E. Miller and Ivan P. Kaminow, Academic Press, Inc., Harcourt Brace Jovanovich, Publishers (1988), Chapter 11, *Waveguide Electrooptic Devices for Optical Fiber Communication*, Steven E. Korotky and Rod C. Alfemess, the contents of which are incorporated herein by reference; and in pending U.S. patent application Ser. No. 08/365,618 entitled MONOLITHIC OPTICAL WAVEGUIDE FILTERS BASED ON FOURIER EXPANSION, which was filed by Charles H. Henry, et als. on Dec. 12, 1996, the contents of which are also incorporated herein by reference.

A discontinuity in the downstream fiber attached to waveguide 46 or waveguide 48 will cause light be reflected back toward the OTDR 32. The reflected light will work its way through the WDM 42 (or 44, depending upon whether the discontinuity was in the fiber 47 or the fiber 49), and the test signal router device 40.

As will be obvious to those skilled in the art, numerous changes can be made to the preferred embodiment of the invention without departing from the spirit or scope of the invention described herein.

I claim:

1. An optical integrated circuit comprising:

a first wave division multiplexer having a first optical transmission path therethrough, said first wave division multiplexer for receiving a first optical signal from said first optical transmission path and for transmitting said first optical signal on said first optical transmission path, said first optical signal having a first wavelength;

a second wave division multiplexer having a second optical transmission path therethrough, said second wave division multiplexer for receiving a second optical signal from said second optical transmission path and for transmitting said second optical signal on said second optical transmission path, said second optical signal having said first wavelength, said first optical transmission path independent of said second optical transmission path; and an optical signal router having an input port and a pair of output ports for routing portions of an input optical signal in a wavelength region to each of said wave division multimplexers, wherein said first wavelength is outside of said wavelength region.

2. The optical integrated circuit of claim 1, wherein said optical signal router comprises a power splitter.

3. The optical integrated circuit of claim 1, wherein said optical signal router comprises a third wave division multiplexer.

4. The optical integrated circuit of claim 1, wherein said first and second wave division multiplexers are each comprised of a Mach-Zehnder interferometer.

5. The optical integrated circuit of claim 1, wherein said first wave division multiplexer, said second wave division multiplexer, and said optical signal router are coupled to a single substrate.

* * * * *